United States Patent
New et al.

(10) Patent No.: US 10,068,195 B2
(45) Date of Patent: Sep. 4, 2018

(54) METHODS AND SYSTEMS FOR MANAGING PRODUCT DISTRIBUTION AND DATA HUB FOR CONNECTING AND INTEGRATING RELATED SYSTEMS

(71) Applicants: John R New, Newtown Square, PA (US); Dylan Straughan, Philadelphia, PA (US)

(72) Inventors: John R New, Newtown Square, PA (US); Dylan Straughan, Philadelphia, PA (US)

(*) Notice: Subject to any disclaimer, the term of this patent is extended or adjusted under 35 U.S.C. 154(b) by 362 days.

(21) Appl. No.: 14/756,755

(22) Filed: Oct. 7, 2015

(65) Prior Publication Data

US 2016/0174471 A1    Jun. 23, 2016

Related U.S. Application Data

(60) Provisional application No. 62/122,097, filed on Oct. 10, 2014.

(51) Int. Cl.
*G06Q 10/08* (2012.01)
*A01G 7/00* (2006.01)

(52) U.S. Cl.
CPC .............. *G06Q 10/08* (2013.01); *A01G 7/00* (2013.01)

(58) Field of Classification Search
CPC .................................................... G06Q 10/08
See application file for complete search history.

(56) References Cited

U.S. PATENT DOCUMENTS

| | | | | |
|---|---|---|---|---|
| 8,938,218 B2* | 1/2015 | Pande | .................. | A01B 79/005 |
| | | | | 455/406 |
| 2010/0109946 A1* | 5/2010 | Pande | .................. | A01B 79/005 |
| | | | | 707/759 |
| 2013/0185104 A1* | 7/2013 | Klavins | ................ | G06Q 10/063 |
| | | | | 705/7.12 |
| 2014/0288714 A1* | 9/2014 | Poivet | .................... | G05B 15/02 |
| | | | | 700/275 |
| 2015/0100358 A1* | 4/2015 | Klavins | ................ | G06Q 10/063 |
| | | | | 705/7.12 |
| 2015/0106141 A1* | 4/2015 | Klavins | ................ | G06Q 10/063 |
| | | | | 705/7.12 |
| 2015/0106280 A1* | 4/2015 | Klavins | ................ | G06Q 10/063 |
| | | | | 705/317 |
| 2015/0106281 A1* | 4/2015 | Klavins | ................ | G06Q 10/063 |
| | | | | 705/317 |
| 2016/0174471 A1* | 6/2016 | New | ...................... | G06Q 10/08 |
| | | | | 700/275 |

* cited by examiner

*Primary Examiner* — Douglas Menz

(57) ABSTRACT

Method, apparatus and systems for managing product distribution and a data hub for connecting and integrating related systems are described herein. Data hubs are integrated with external sensors and automated systems to remove stress points for operating such systems. A distribution system which may interface with the data hubs allows for efficient distribution of products produces and monitored by environments that suffer such stress points.

11 Claims, 5 Drawing Sheets

METHODS AND SYSTEMS FOR MANAGING PRODUCT DISTRIBUTION AND DATA HUB FOR CONNECTING AND INTEGRATING RELATED SYSTEMS

RELATED APPLICATIONS

This application claims the benefit of U.S. Provisional Patent Application Ser. No. 62/122,097, filed on Oct. 10, 2014 entitled METHODS AND SYSTEMS FOR MANAGING PRODUCT DISTRIBUTION AND DATA HUB FOR CONNECTING AND INTERGRATING RELATED SYSTEMS, the teachings of which are incorporated herein by reference.

FIELD OF THE DISCLOSURE

The subject matter described herein relates generally to product management and distribution systems and to systems for connecting and integrating the development and management of products, sometimes referred to as a "data hub", that may be provided to the system for distribution. More specifically, the subject matter described herein relates to the distribution of agrarian products, and the production of agrarian products in a controlled environmental agrarian (CEA) system.

BACKGROUND OF THE DISCLOSURE

The production, management and distribution of goods and services in a large economic environment present operational difficulties, especially for smaller players in an industry. With the use of computer automated systems companies like Wal-Mart™ (trademark owned by the Wal-Mart company of Bentonville, Ark.) have been able to maximize their efficiencies with advanced inventory monitoring and stocking.

Even service industries, for example the restaurant industry, have developed computer based systems to manage their "inventory", that is, the availability of seats in a restaurant at specific times, referred to as "reservations". The OpenTable™ (trademark owned by Priceline Group) web-based restaurant reservations systems allows the industry, through a fee based revenue structure, to manage reservations in an accurate and simple manner.

Prior to OpenTable, diners had to have an understanding of the restaurant "scene" in a certain location, or rely on different blogs or websites to find the type of restaurants they where they wished to dine. Diners would then have to call the restaurant and get a reservation at a certain time. If they did not have seating at that time it would be a laborious process to call several other restaurants to see if they had availability. On the restaurants side, they would have to field all these calls as well as have software that they would use to book the reservations. OpenTable provides a very simple and effective value proposition for both the consumers and restaurants. Through OpenTable's interface, consumers are able to see which restaurants in a given area or given cuisine are appealing based on several criteria, and also are able to see which have desirable times for a reservation. Diners are able to read reviews and have a more complete understanding of the dining experience they are about to go to. OpenTable also provides the restaurant industry with a vehicle for member restaurants to book reservations from customers with little cost of acquisition (in labor, or by creating their own application, etc.), as well as providing software for managing their front house operations. OpenTable keeps track of VIP's, customer preferences and repeat customers, provides table management software which assists restaurant staff in planning seating arrangements, for example, during busy times. This system also integrates with existing point-of-sale databases to retain check spend data by reservation. These, along with other reports, provide efficiencies for the entire front end of the restaurant industry.

The agrarian industry suffers from similar problems to both Walmart and OpenTable, and is populated by many smaller growers and distributors which simply do not have the wherewithal or expertise to efficiently manage their product development, distribution, maintenance and tracking. Moreover, due to the high level of complexity of CEA systems, it is difficult to operate one at a maximum level of production without having highly trained staffers.

Small farms, for example, have been unable to make an impact on the industrial food complex for many reasons. First, they do not have the critical product mass to make purchasing from them profitable for the majority of wholesalers or retailers. Second, food safety standards are quite lenient and very hard to enforce, making selling into more regulated establishments (large supermarket chains) difficult. Therefore, small farmers have been confined to selling their products at roadside stands, farmers markets, as a result of direct agreements with restaurants, or through Community Supported Agriculture (CSA) models. However, several of these sales mechanisms can be very risky. For example, if it rains during a farmers market, much of a farmer's produce may not be bought, which can be financially crippling. It would be desirable to develop systems to aid small agrarian businesses to cope with these and other issues.

As mentioned above, it is difficult to operate such systems at a maximum level of production without having highly trained staffers. It would therefore also be desirable to develop automated systems which allow producers to be relieved of the stress points inherent in operating CEAs so that the systems can operate without the need for highly trained information technology specialists, but which are adaptable for managing complex parameters in agrarian environments which may require varied sensor inputs and data management. Such systems should be interactive with the worldwide web, and allow farmers, distributors, customers and retailers to interact for maximum product freshness, variety and affordability. Such needs have not heretofore been achieved in the art.

SUMMARY OF THE DISCLOSURE

Method, apparatus and systems for managing product distribution and a data hub for connecting and integrating related systems are described herein. Data hubs are integrated with external sensors and automated systems to remove stress points for operating such systems. A distribution system which may interface with the data hubs allows for efficient distribution of products and relieves stress points in production and distribution.

A controlled environmental agrarian system (CEA) is disclosed which comprises a hub containing a computer for collecting, processing and communicating data throughout the CEA; an external sensor interface, in communication with the hub, for receiving data from external sensors which monitor processes in the CEA that can be controlled by the CEA to implement automated systems that will manage production of agrarian products in the CEA; an automated system interface, in communication with the hub, which, in conjunction with data received at the external sensor interface and processed by the hub, allows the hub to determine parameters related to how the automated systems should operate in view of the data received from the external sensors; and an interaction interface, in communication with the hub, which allows the hub to generate and provide instructions to interactivity devices that will allow the automated systems to be managed in view of the parameters determined by the hub so that production of the agrarian products will be achieved.

Preferred aspects of the disclosure will be best understood by reading the following detailed description in conjunction with the drawings, which are first described briefly below.

DETAILED DESCRIPTION OF PREFERRED EMBODIMENTS

Figure 1:
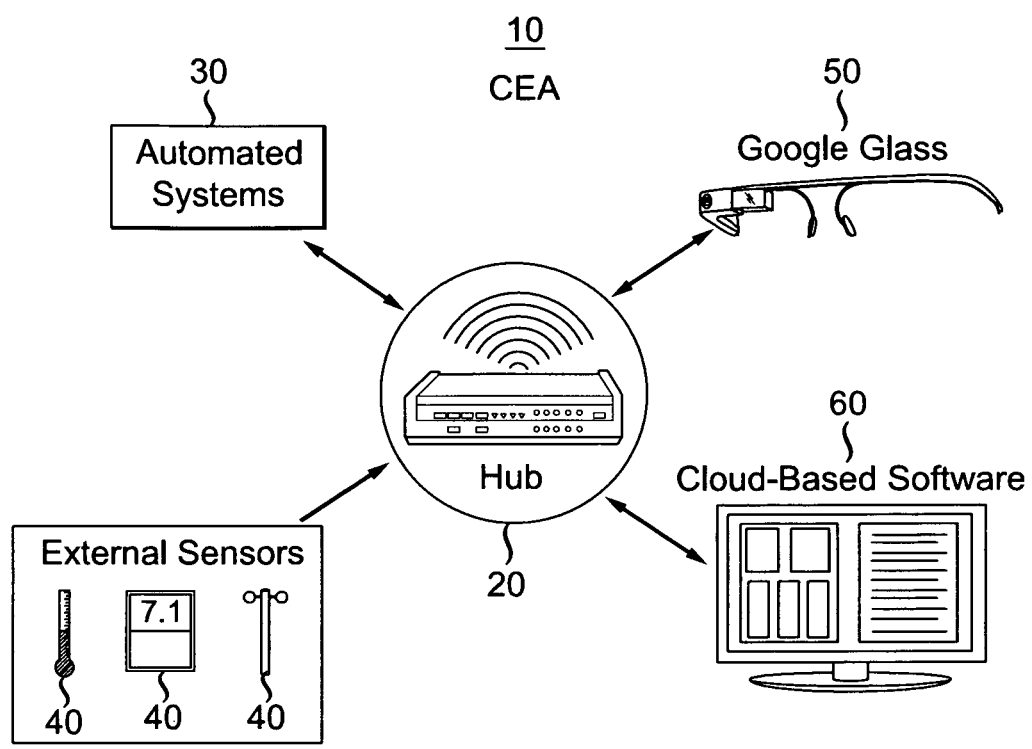
FIG. 1 is a block diagram of a preferred data hub and CEA system employing the present principles.

Referring now to the drawings wherein like reference numerals refer to like elements, FIG. 1 describes a computer system 10 which may be used to manage, develop and integrate a CEA in accordance with the present principles herein described. A data hub 20 comprising a computer preferably having wireless or wired communications capabilities communicates with external elements of the of the system 10. The computer 20 is a data hub since it may contain all of the necessary elements to collect, process and communicate data obtained from, and distributed throughout, the system 10, as well as all necessary communications elements which will efficiently allow such communications and data manipulation to occur, either automatically or with operator assistance and/or modifiable programming.

As has been discussed earlier, due to the high level of complexity of CEA systems, it is difficult to operate a CEA system at high levels of production or efficiency without having highly trained staffers. To solve these issues, the data hub is interfaced with automated systems 30, external sensors 40, interactivity devices 50, such as for example, smartphone or wearable technology, which will allow users and workers in the system 10 to interact, and engage, with various components of system as well as software 60 to manage and control system 10. It will be appreciated by those with skill in the art that elements 30-60 may interact with and through data hub 20, and that data hub 20 may be integrated with software 60 to form a unified or distributed computer system as is necessary to accomplish the specific needs of the CEA of FIG. 10. Moreover, software 60 could be cloud-based, in that it may interact through, or reside in, external servers or computers outside of system 10, or could be integrated within data hub and computer 20, or even reside in data hub 20, or be a part of a separate computer processor found within, or external to, system 10. All such embodiments, and equivalents, are within the scope of the present principles. Implementation of system 10 will eliminate most, if not all, of the stress points typically associated with operating a CEA as described herein.

The data hub 20 will use the external sensors 40 to determine which and when each automated system 30 should operate. Through human interactive devices, for example with Google Glass, other wearable technology, or smartphones connected to the data hub 20, the software 60 will be able to assess growth patterns of current plants to project inventory into the future, manage plant production and integrate market factors for crop development and product distribution. Any type of device 50 for providing human or machine interaction with the system may be used, for example, laptops, tablets, PDAs, desktop computers, servers and other types of devices. The interactions available to the systems can be monitored by the data hub of computer 20 to allow for adjustments to be made to the automated systems as necessary based on an analysis of the data and data reduction techniques provided by the software 60. This will allow the CEA of system 10 to be smoothly operated without any of the difficulties or stresses which have plagued such rudimentary systems in the past.

By implementing sensors 40 throughout a greenhouse, for example, that interact dynamically with a centralized, cloud-based database 60, preferred systems can communicate with automated system processes, collect and analyze data for optimizing plant growth, and create a failsafe mechanism for problems within the CEA facilities. Sensor integration allows the system 10 to monitor CEA systems similar to a home security system which monitors a home. Furthermore, these sensors 40 provide data that communicates with automation of several other processes through machine-to-machine communication based on back-end algorithms that can provide significant gains in production and yield times. The sensors 40 that may, for example, be integrated into preferred CEA systems are ammonia sensors, nitrate/nitrite sensors, air and water temperature sensors, humidity sensors, water level sensors, pH sensors, dissolved oxygen sensors, HD cameras, calcium sensors, potassium sensors, light spectrometers and light intensity sensors, water flow sensors, lasers, as well as other sensors which may be relevant for the particular CEA system that is being implemented.

It will also be appreciated that depending on the scale and the need for automated system processes 30, preferred CEA systems can implement a variety of dynamically integrated processes that will help customers grow more efficiently. For example, through use of a gas chromatograph to measure photosynthetic activity and efficiency, data can be analyzed and collected so variable spectrum lighting can provide the most desired lighting environment for each species of plant that is to be produced. Through Bluetooth enabled LED lighting and lumen sensor integration in CEA facilities, for example, it is possible to reproduce, and even enhance the natural environment in which specialty crops grow thereby increasing yields and allowing for shorter maturation times.

Another preferred automated system process is the enhanced automation of automatic fish feeders that interact with sensors taking into consideration factors such as time of day, aeration, ammonia levels, etc. to decide optimal feed times and feed amounts for the specific fish species that can be grown.

It is known to use computer vision, often in large-scale commercial production, for several agricultural processes. The use of such computer vision systems can be modified and enhanced in accordance with the present principles by installing optic sensors that will be able to determine anomalies in greenhouse production, detecting symptoms such as wilting or yellowing of the leaves, and giving updates and early warning notices to greenhouse managers. Installation of optic sensors will also enable detection of fish activity, and even the ripeness of tomatoes, which minimizes the need for on-site skilled labor.

Robotic seeders provide several advantages when compared to human laborers. First, they are able to seed out trays in a fraction of the time that would traditionally be allocated to the task. However, because of their precision, robotic seeders place the seed exactly the same depth in the medium which is used to grow (normally rockwool), which in turn increases germination rates. Such seeders may be automated in accordance with the principles of the present disclosure. If problems do arise that can cause catastrophic damage to a crop or fish, CEA systems described herein can use automated valve shut offs to make sure that damage is mitigated or contained.

As the field of organic Integrated Pest Management (IMP) has grown, needs have developed for automating related systems to improve efficiencies. The present principles are applicable to putting together an IMP specifically for aquaponics applications. Through the use of natural sprays, sprenches, and drenches to combat common greenhouse pests while maintaining clean water quality for aquaculture production, IMPs can be more accurately developed and managed as described herein. New applications, such as air quality manipulations can also be utilized to sustainably treat pest infestations.

The software 60 of the present CEA system provides many applications for management and control of a CEA. For example, real-time tracking of the development of each plant in the greenhouse throughout its growth cycle is provided in accordance with the present principles. "Smart-tags" for such tracking will allow for automatic daily updating of necessary tasks to be completed, as well as real-time harvest projections. Each subset of plants is tagged and logged with a species name, date seeded, time to maturation, and other essential information. Data-logging services provide a full view and dynamic inventory of each facility in real-time, allowing operators to see past, present, and future trends within their production.

Figure 2:
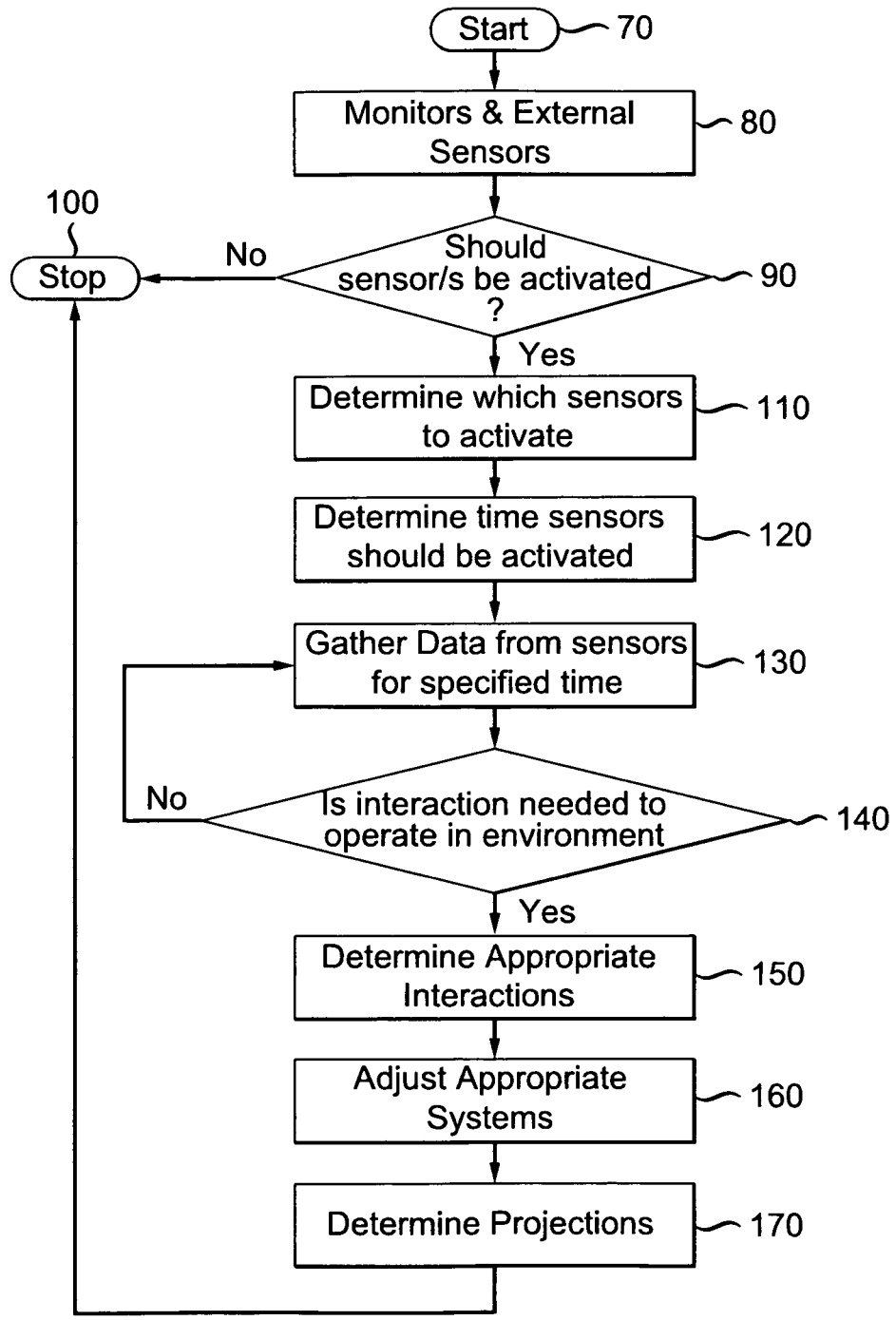
FIG. 2 is a flow chart of a method for gathering data from a CEA system.

Referring to FIG. 2, a method for implementing the present principles starts at 70. At 80 external sensors are monitored and at step 90 it is determined whether one or more sensors should be monitored, activated or accessed. If not, then the method stops at 100. If so, then at step 110 it is determined which sensors should be monitored, activated or accessed. At step 120 it is determined for how long a time and/or for how long the sensors should be activated, monitored or accessed.

At step 130 the data is gathered from the sensors for the specified time, and at step 140 it is determined whether an interaction with the environment is required based on the data gathered at step 130. If not, then the method returns to step 130. If so, then at step 150 the appropriate environmental interactions are determined by the system 10. At step 160, the appropriate actions are imposed by the system 10 and/or the correct adjustments to the automated systems are made. At step 170, data determinations are made, for example, crop projections or other information obtained through a data reduction procedure and then the method stops at step 100. It will be appreciated that the order of the steps of FIG. 2 is not fixed or limiting, and that additional steps required for the CEA of interest are possible.

Other principles incorporating the principles of the present CEA systems described herein are applicable to computer or web based supply-chain management software that will provide methods and systems for stakeholders in agriculture to connect in a marketplace to buy and sell products and services. Such present systems will connect, for example, producers of agrarian products and food products who distribute such goods, small and large farms that produce agrarian products, wholesalers and processors that sell and process agrarian products in their chain of goods, retailers, and all manner of transportation modalities and systems. As used herein, such present systems and associated methods are referred to as "CropShop".

With CropShop, producers of food or food products could market their goods to wholesalers throughout the country or the world. No longer would a berry farmer have to call several regional wholesalers to see who had the capacity to buy their produce. Advantageously, farmers could input data about their wares into CropShop, which would instantly connect them with thousands of distributors nationally and internationally which could buy their product. This system would naturally smooth supply shortages for different products throughout the nation because higher price points would be attainable in different geographies based on consumer demand. Producers would have a more accurate understanding of where to sell their products to attain the highest possible prices for their products.

Integration of farms, especially smaller farms, is advantageously provided by CropShop in accordance with the present principles described herein. In the past, small farms and farmers have been unable to make an impact on the industrial food complex for many reasons. First, they do not have the critical product mass to make purchasing from them profitable for the majority of wholesalers or retailers. Also, food safety standards are quite lenient and very hard to enforce, making selling into more regulated establishments (large supermarket chains) difficult. Therefore, small farmers have been confined to selling their products at roadside stands, farmers markets, through direct agreements with restaurants, or through CSAs. However, several of these sales mechanisms can be very risky as mentioned above. CropShop will provide several off-take mechanisms for small farmers, including mechanisms to interact with restaurants directly, interact with consumers at farmers markets, and even create a platform for an integrated CSA model that can be distributed via a white glove delivery service.

The value proposition of CropShop for wholesalers and processors is simply expanding their marketplace. The use of CropShop will provide more consumers and farmers access to more producers and make them aware of wholesalers' and processors' specialties and capabilities. This will allow wholesalers/processors to further expand their operations and to bring in food products to cater more specifically to their customers' needs.

Retailers benefit from using CropShop by being able to see what food products are available through wholesalers/processors. Since retailers' contracts with wholesalers are normally 12 months or longer, retailers could now provide feedback per their preferences on producers. When deciding which wholesaler to use, retailers would have a much better idea of what advantages are available and could compare them side by side.

Long-distance and localized trucking companies, as well as other types of shippers (boat, air and rail, for example) can be integrated into CropShop to make sure that there is a distribution capability built into the marketplace. Transportation companies could use CropShop to make sure that their trucks were loaded to capacity by seeing all shipments that would have to be moved from distribution centers throughout the country. This way they could maximize utility of vehicles and increase profit by moving produce from several different clients simultaneously.

Through the use of CropShop and CEA systems provided herein, no longer would the berry farmer have to call several regional wholesalers to see who had the capacity to buy their produce. This system would naturally smooth supply shortages for different products throughout the nation because higher price points would be attainable in different geographies based on consumer demand. Producers would have a more accurate understanding of where to sell their products to attain the highest price for their products possible. CropShop will allow for several off-take mechanisms for small farmers, including mechanisms to interact with restaurants directly, interact with consumers at farmers markets, and even create a platform for an integrated CSA model that can be distributed via a white glove delivery service.

Figure 3:
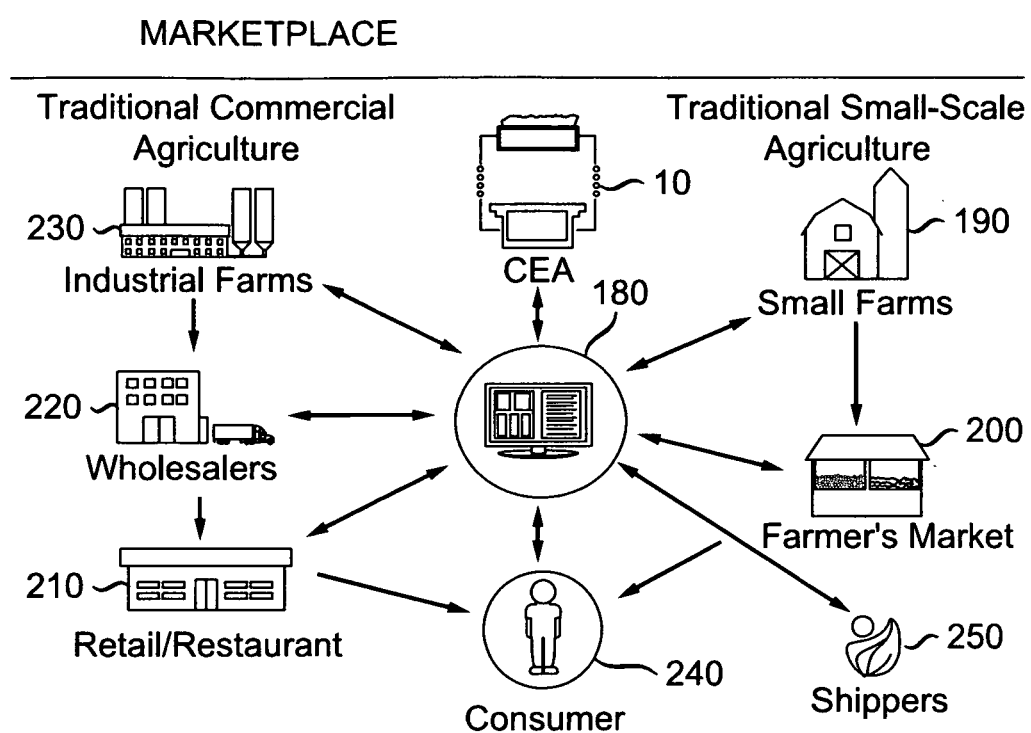
FIG. 3 is a block diagram of a product distribution and management system employing the present principles.

Referring now to FIG. 3, an embodiment of CropShop is illustrated. The CEA of FIG. 1, shown at 10, may be integrated into the software management system that will implement CropShop. As described earlier with respect to the CEA of FIG. 1, the CropShop system may be web-based, may reside on a single computer or server, or may be distributed in many software locations. Such a CropShop computer system 180 advantageously communicates with CEA system 10, although other systems may also communicate with computer system 180, or the CEA may not be directly in communication with CropShop computer system 180, but rather communicate through other modalities. It will be further appreciated that CropShop computer system 180 will run appropriate integrated software to achieve the present principles. Such software may be customized, designed completely anew, or be a combination of known software packages and customized or new software, depending on the needs of a CropShop system of the present principles. A CropShop system may be developed for specific markets, may be agrarian based, agriculturally based, or applicable to similar types of systems that require the types of management attention that CropShop is meant to address, or problems that CropShop is meant to solve. As such, a CropShop system as disclosed herein may be custom designed for a user or an industry.

The computer 180 communicates through a network, for example the Internet, to small farmers 190, farmers markets 200, retailers 210, for example restaurants, wholesalers 220, industrial farms 230, consumers 240 and shippers 250. It will be appreciated that any other entities that must be involved in the distribution or supply chain which CropShop manages may also interface with computer 180. Moreover, any type of related software to achieve such communications may be integrated by computer 180.

Figure 4:
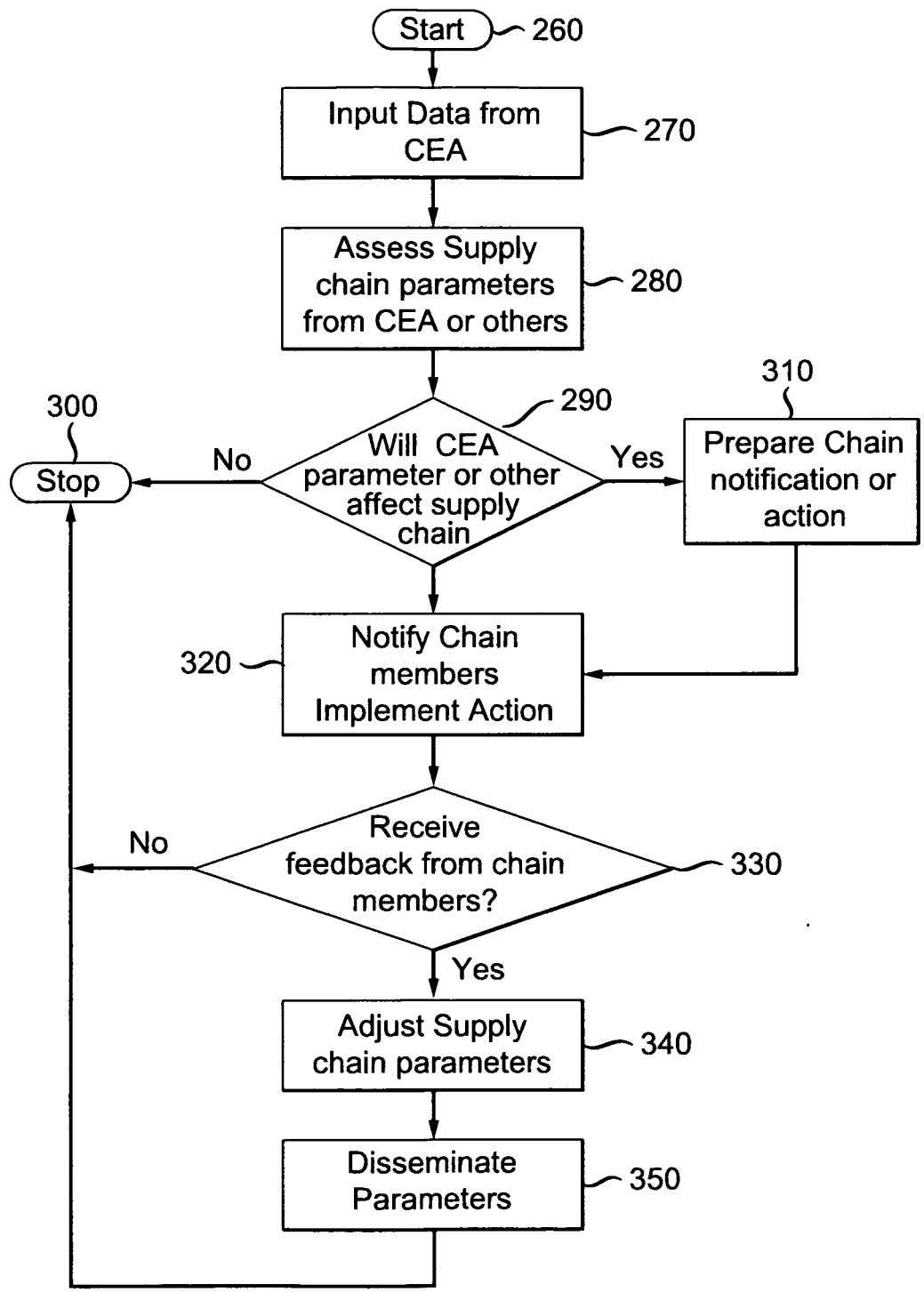
FIG. 4 is a flow chart of a method for employing a product distribution and management system.

Referring now to FIG. 4, a flow chart for implementing a preferred method for CropShop begins at step 260. At step 270, data may be input to the computer 180 by CEA system 10. At step 280, supply chain parameters are assessed as needed from the various members of the supply chain described above. This may include data from the CEA 10, but may also include other types of data. A combination of CEA system data and other data may also be assessed. At step 290, it is determined whether the data will have an effect on the operation of the supply chain. If not, then the method stops at step 300. If so, then at step 310 the members of the chain effected may be notified, or an action may be implemented, for example a distribution of goods may be planned or implemented, or both notification and action may be occur. These and other possibilities have been described above with respect to the description of CropShop above.

At step 320 the chain members are then notified and/or the action determined by the system is implemented. It is then determined at step 330 whether feedback from any of the chain members has been received and whether further action is necessary. If not then the method ends at step 300. If so, then at step 340, adjustments in the chain for the goods or services are made, or further actions required by the chain members, or others, are taken. If other supply chain parameters are developed in response to the further action or adjustments, then these are disseminated to the chain members at step 350. The method then stops at step 300.

Figure 5:
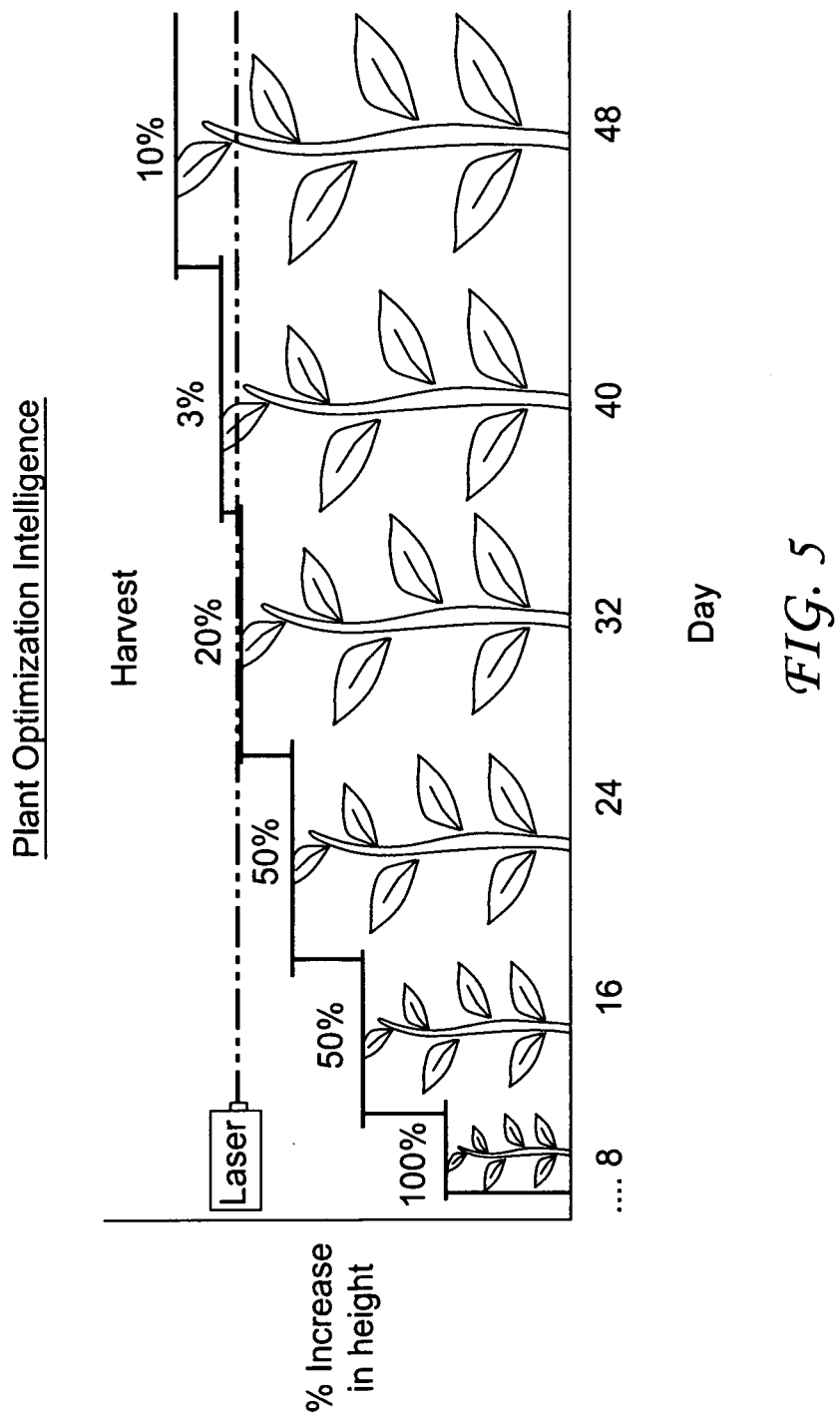
FIG. 5 illustrates plant optimization intelligence provided as a preferred embodiment of the principles described herein.

FIG. 5 illustrates the use of preferred systems and methods to plan and implement plant optimization intelligence in accordance with the present principles. Through analyzing data from sensors, lasers, and computer vision, users of the CEAs and CSAs described herein will be able to predict the most economically viable time to harvest crops based on their rate of growth, as well as price points in the market. This way CEA farmers will be able to achieve maximum yield per year since they will have data to make sure they are using space within their CEA systems as effectively as possible at all times.

For example, the embodiment of FIG. 5 utilizes a laser as a sensor 40 which will sense or measure the height of the plant or a crop over time. Then, the system 60 can determine the increase in the height of the plant over the number of days that the plant is growing. As can be seen, in the first eight days the plant increases in height by 100%. By the sixteenth day (an additional eight days), the plant has increased by 50%. As the days progress, the rate of growth slows, so that by day forty-eight, a 10% increase in plant size is achieved between the fortieth and forty-eighth day.

By sensing the change in growth rates, with the laser and calculating the rate of change of growth rate, the principles disclosed herein give the farmer an accurate tool for determining when it is optimal to pick or harvest the crop since at some point in the growth cycle, growth rate slows to the point where it is not economically necessary or feasible to continue to grow the plant for additional height or yield. Thus, the system determines when it is economically optimal to harvest the crop, and automatically informs the farmer that it is time to harvest. Alternatively, the system may also, or in conjunction with informing the farmer of the economically optimum time to harvest, initiate a process where harvesting occurs automatically, where plant feeding or watering is altered, changed or stopped, or where additional actions may be taken, for example, to add increased fertilizing or plant therapy techniques.

Moreover, the system of FIG. 1 may also inform the distribution network of FIG. 3 that the crop is getting ready to be harvested based on the analysis being performed by the laser measurements so that the distribution system can become prepared for the increased yield of the crop that is getting ready to enter the system for distribution. Additionally, the shipping and distribution steams can be tailored to prepare for the particular shipping needs required by the expected crop harvest, and the restaurants in the stream of commerce can prepare for the increased availability of the crop to be harvested, thereby allowing the restaurants to accurately plan specific menu items using the newly available crop. Many other notifications, plans, and distribution modes will be apparent to those with skill in the art due to the accurate plant optimization intelligence described herein.

As will be appreciated by those skilled in the art, the systems, apparatus and methods described herein can be implemented in hardware, software or firmware, or combinations of these modalities, in order to provide flexibility for various environments as discussed throughout this disclosure. Application specific integrated circuits (ASICs), programmable array logic circuits, discrete semiconductor circuits, processors configured to perform these functions, and programmable digital signal processing circuits, computer readable media, transitory or non-transitory, among others, may all be utilized to implement the present disclosure. These are all non-limiting examples of possible implementations of the several preferred embodiments of the present disclosure, and it will be appreciated by those skilled in the art that other embodiments may be feasible.

There have thus been described certain preferred embodiments of methods and apparatus for managing product distribution and a data hub for connecting and integrating related systems. While preferred embodiments have been described and disclosed, it will be appreciated by those with skill in the art that modifications are within the true spirit and scope of the described principles.

What is claimed is:

1. A controlled environmental agrarian system (CEA), comprising:
   a hub containing a computer for collecting, processing and communicating data throughout the CEA;
   an external sensor interface, in communication with the hub, for receiving data from external sensors which monitor processes in the CEA that can be controlled by the CEA to implement automated systems that will manage production of agrarian products in the CEA, wherein the external sensor comprises one of a group consisting of an ammonia sensor, a nitrate sensor, a nitrite sensor, an air temperature sensor, a water temperature sensor, a humidity sensor, a water level sensor, a pH sensor, a dissolved oxygen sensor, an camera, a calcium sensor, a potassium sensor, a light spectrometer, a light intensity sensor, a water flow sensor, an optical sensor, a computer vision sensor, and a laser;
   an automated system interface, in communication with the hub, which, in conjunction with data received at the external sensor interface and processed by the hub, allows the hub to determine parameters related to how the automated systems should operate in view of the data received from the external sensors;
   an interaction interface, in communication with the hub, which allows the hub to generate and provide instructions to interactivity devices that will allow the automated systems to be managed in view of the parameters determined by the hub so that production of the agrarian products will be achieved; and
   an automated system adapted to Interface with the automated system interface to provide activities to the CEA in response to the hub issuing an instruction to the automated system, and to and to provide machine to machine interaction between the sensor and the interactivity devices to provide automated management of the CEA.

2. The CEA of claim 1, further comprising a management control processor interfaced with the hub which allows the hub to generate the instructions and issue the instructions to the automated systems to adjust the automated systems in view of the parameters and data gathered from the external sensors.

3. The CEA of claim 2, wherein the management control processor further comprises a smart tag interface for providing real-time harvesting projections of harvest of the agrarian products.

4. The CEA of claim 2, further comprising an external sensor adapted to interface with the external sensor interface and to provide the data to the external sensor interface.

5. The CEA of claim 2, wherein the automated system comprises one of a group consisting of a gas chromatograph for variable spectral lighting, light emitting diode (LED) for adjusting spectral illumination of plants, automated fish feeders, robotic seeders, greenhouse production systems, integrated pest management systems, air quality systems, and growth rate prediction systems.

6. The CEA of claim 2, further comprising an interactivity device adapted to interface with the hub to allow the hub to manage in view of the parameters determined by the hub.

7. The CEA of claim 6, wherein the interactivity device comp) ices one of a group consisting of a smartphone, a laptop computer, a Tablet, a personal digital assistant (PDA) a desktop computer, a server, wearable technology, Google glasses, and a Bluetooth enabled device.

8. A system for managing agrarian product distribution comprising:
   a computer that contains an interface for communicating with individuals in an agrarian supply chain through a network to manage and coordinate distribution of the agrarian product; and
   a controlled environment agrarian (CEA) system which manages the production of the agrarian product and provides predictions as to the availability and pricing of the agrarian product to the computer, wherein the CEA comprises a hub containing a computer for collecting, processing and communicating data throughout the CEA;
   an external sensor interface, in communication with the hub, for receiving data from external sensors which monitor processes in the CEA that can be controlled by the CEA to implement automated systems that will manage production of agrarian products in the CEA, wherein the external sensor comprises one of a group consisting of an ammonia sensor, a nitrate sensor, a nitrite sensor, an air temperature sensor, a water temperature sensor, a humidity sensor, a water level sensor, a pH sensor, a dissolved oxygen sensor, an camera, a calcium sensor, a potassium sensor, a light spectrometer, a light intensity sensor, a water flow sensor, an optical sensor, a computer vision sensor, and a laser;
   an automated system interface, in communication with the hub, which, in conjunction with data received at the external sensor interface and processed by the hub, allows the hub to determine parameters related to how the automated systems should operate in view of the data received from the external sensors; and
   an interaction interface, in communication with the hub, which allows the hub to generate and provide instructions to interactivity devices that will allow the automated systems to be managed in view of the parameters determined by the hub so that production of the agrarian products will be achieved; and
   an automated system adapted to interface with the automated system interface to provide activities to the CEA in response to the hub issuing an instruction to the automated system, and to and to provide machine to machine interaction between the sensor and the interactivity devices to provide automated management of the CEA.

9. The system of claim 8, wherein the CEA further comprises a management control processor interfaced with the hub which allows the hub to generate the instructions and issue the instructions to the automated systems to adjust the automated systems in view of the parameters and data gathered from the external sensors.

10. The system of claim 9, wherein the management control processor further comprises a smart tag interface for providing real-time harvesting projections of harvest of the agrarian products.

11. The system of claim 9, further comprising an interface in communication with the hub which provides an adjustment to the distribution of the agrarian product when the CEA determines that a condition in the CEA causes a need for the adjustment.

* * * * *